United States Patent [19]

Fujie et al.

[11] 4,412,527

[45] Nov. 1, 1983

[54] GREENHOUSE OF AN UNDERGROUND HEAT ACCUMULATION SYSTEM

[75] Inventors: Kunio Fujie, Tokyo; Akinari Uchida, Ibaraki; Kazuhiko Abe, Urawa, all of Japan

[73] Assignee: Hitachi, Ltd., Tokyo, Japan

[21] Appl. No.: 251,544

[22] Filed: Apr. 6, 1981

[30] Foreign Application Priority Data

Apr. 9, 1980 [JP]  Japan .................................. 55-45594

[51] Int. Cl.³ ............................ F24H 7/00; F24J 3/02
[52] U.S. Cl. ................................. 126/400; 126/436; 47/17; 165/45
[58] Field of Search ............... 126/400, 436, 429, 430, 126/442, 450; 165/45, 47; 47/17, 1, 2

[56] References Cited

U.S. PATENT DOCUMENTS

| | | | |
|---|---|---|---|
| 3,815,574 | 6/1974 | Gaydos, Jr. | 126/436 |
| 3,970,069 | 7/1976 | Pickett | 126/422 |
| 4,059,146 | 11/1977 | Gruniger | 126/400 |
| 4,111,189 | 9/1978 | Dizon | 126/400 |
| 4,153,047 | 5/1979 | Dumbeck | 126/400 |
| 4,265,300 | 5/1981 | Kurimoto | 47/17 |

FOREIGN PATENT DOCUMENTS

| | | | |
|---|---|---|---|
| 2800512 | 7/1979 | Fed. Rep. of Germany | 126/436 |
| 11106 | of 1910 | United Kingdom | 47/17 |

*Primary Examiner*—James C. Yeung
*Attorney, Agent, or Firm*—Antonelli, Terry & Wands

[57] ABSTRACT

A greenhouse of an underground heat accumulation system wherein the radiant energy of the sun or wasted thermal energy is accumulated in the soil below the floor of the greenhouse over a prolonged period of time, and spontaneous release of the accumulated energy into the interior of the greenhouse begins in the wintertime due to a time lag of heat transfer through the soil. The release of the accumulated energy lasts throughout the winter.

14 Claims, 5 Drawing Figures

000000
GREENHOUSE OF AN UNDERGROUND HEAT ACCUMULATION SYSTEM

BACKGROUND OF THE INVENTION

FIELD OF THE INVENTION

This invention relates to a greenhouse of an underground heat accumulation system in which radiant energy of the sun or wasted thermal energy is stored under the ground for use in heating the interior of the green-house.

Several different heating systems are available for greenhouses of the prior art, which systems include a stove system, a hot air system, a hot water system, a steam system and an electric heat system. They all depend on fossil fuel as the source of energy, and the amount of the thermal energy used for this purpose is constantly increasing with the development of cultivation of plants all the year round. Meanwhile the price of fossil fuel is also yearly increasing and this, combined with a shortage of oil, exerts serious influences on the greenhouse industry. Thus, the need to conserve energy by switching the source of energy elsewhere from the fossil fuel has been keenly felt. In view of this situation, there have recently been made various proposals to adopt a system of heating with accumulated thermal energy by utilizing the radiant energy of the sun or wasted thermal energy to meet the needs of the times. In this system, excess thermal energy that has not been consumed in the daytime is accumulated and released at night for heating purposes. Since this system is generally operated on day-to-day basis for accumulation and release of necessary thermal energy, the system suffers the disadvantage that it does not satisfactorily work when the amount of the accumulated thermal energy is small and inclement weather lasts in the wintertime in the absence of an ancillary thermal energy source. This would cause the temperature in the greenhouse to drop, thereby causing damage to the plants.

SUMMARY OF THE INVENTION

This invention has been developed for the purpose of obviating the aforesaid disadvantage of the prior art. Accordingly the invention has as its object the provision of a greenhouse of the underground heat accumulation system capable of maintaining the temperature in the greenhouse at a suitable level in the wintertime without relying on fossil fuel.

The outstanding characteristic of the invention is that the radiant energy of the sun or wasted thermal energy is stored for a prolonged period of time under the ground on which the greenhouse stands, so that the thermal energy thus stored underground can begin its spontaneous release into the greenhouse when the cold season sets in due to a time lag in the transfer of heat through the soil and the release of the stored thermal energy can last throughout the winter.

DESCRIPTION OF THE PREFERRED EMBODIMENT

Figure 1:
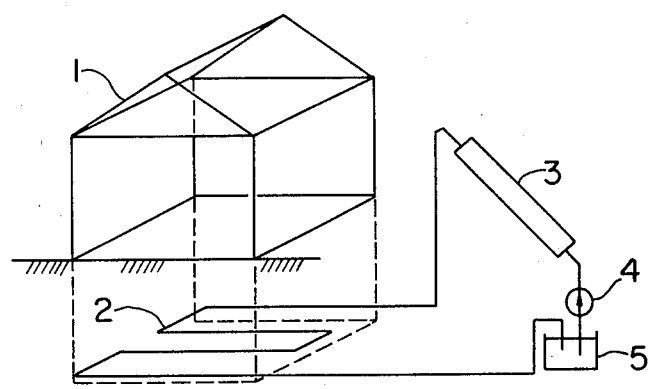
FIG. 1 is a schematic view of the greenhouse of the underground heat accumulation system comprising one embodiment of the invention.
Figure 2:
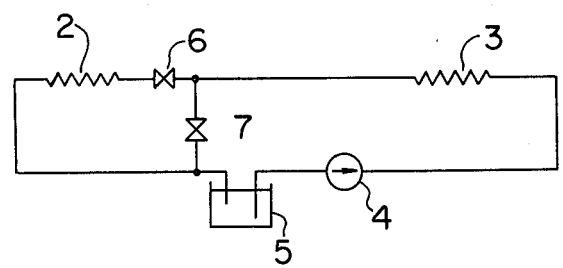
FIG. 2 is a diagram of the heated water system shown in FIG. 1.

Referring now to the drawings and, more particularly to FIGS. 1-2, a greenhouse main body 1 has embedded in the soil under its floor, at a depth of about 1.5 m, an underground radiator 2 which, combined with the soil beneath the greenhouse body 1, constitutes an underground heat accumulating section. The underground radiator 2 is connected to a heat collector 3 through a fluid machine 4, which may, for example, be a pump, and a receiver tank 5 so as to cause hot water heated by the radiant energy of the sun to circulate through the system. The underground radiator 2 comprises a serpentine tube of metal evenly arranged beneath the floor of the greenhouse body 1 which, in the illustrated embodiment, has an area of 24 m$^2$.

In this construction, the temperatures of the hot water flowing through the heat collector 3, as measured at its inlet and its outlet and the differential between the inlet and outlet temperatures, are sensed by sensing means. When the sun shines to a desired degree, the hot water flowing through the heat collector 3 shows a difference in temperature between the inlet and the outlet of the heat collector 3. When the difference is above a predetermined value and the outlet temperature is in the predetermined range of, for example, between 55° C. and 65° C., a valve 6 is opened and a valve 7 is closed to actuate the fluid machine 4 so as to cause a circulating flow of the hot water through the system of the underground radiator 2. In the event that the outlet temperature is lower than the predetermined value range in spite of the fact that there is a temperature difference between the inlet and the outlet of the heat collector 3, the valve 6 is closed and the valve 7 is opened so that the hot water bypasses the underground radiator 2 as it flows in circulation without the hot water flowing from the heat collector 3 to the underground radiator 2. When the difference between the inlet and outlet temperatures of the hot water at the heat collector 3 drops below the predetermined value due to a reduction in the radiation of the sun, the operation of the system is stopped. In this way, the radiant energy of the sun is gradually accumulated in the earth below the greenhouse body 1.

In the embodiment of the above construction, the hot water flows in circulation through the heat collector 3 and the radiator 2 connected in one system. It is to be understood that the invention is not limited to this specific form of medium for transferring thermal energy, and that heated air may be used in place of the hot water.

Alternatively, the heat collector 3 and the underground radiator 2 may be arranged to form separate systems which are connected by a heat exchanger, to allow different forms of fluid to flow in circulation through the different systems. For example, a gas may be through the system of heat collector 3 and a liquid may be circulated through the system of underground radiator 2.

Figure 3:
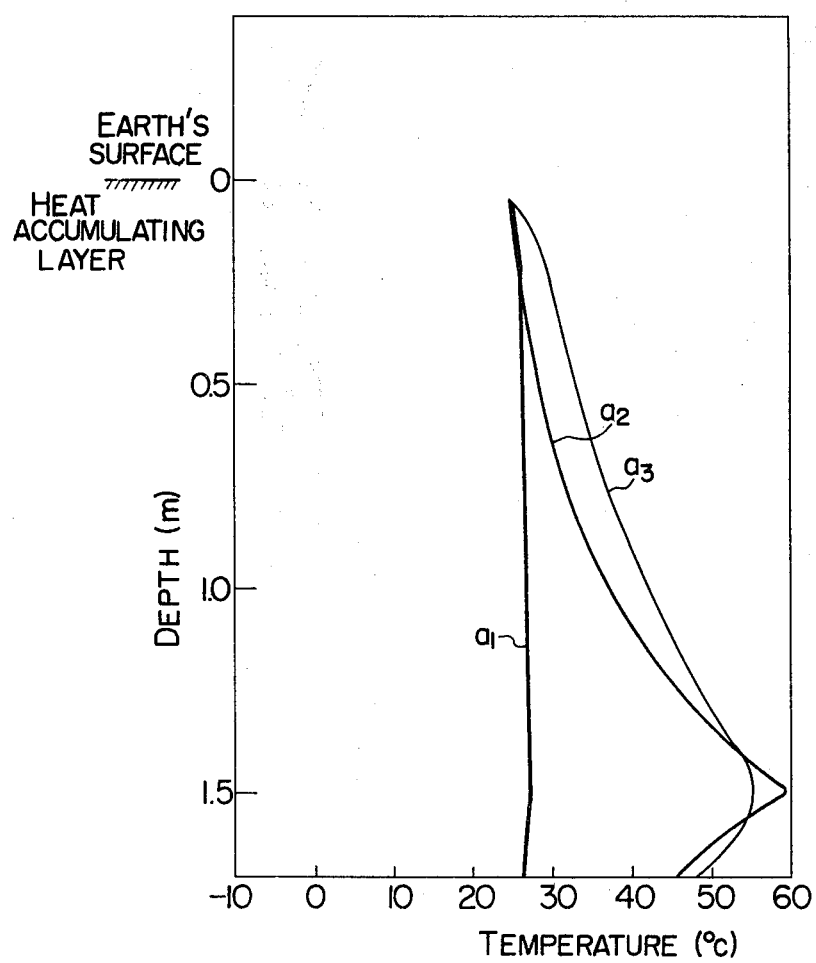
FIG. 3 is a graph in explanation of the distribution of temperature in the underground heat accumulating section shown in FIG. 1.

Accumulation of thermal energy may be started in, for example, October. Then, in about a month, the input to the underground radiator 2 will reach a constant level of about 19.4 w/m$^2$ per unit area. FIG. 3 provides an illustration of the distribution of temperature in the underground heat accumulating section in which a curve $a_1$ shows the temperature at the time of initiation of heat accumulation, a curve $a_2$ shows the temperature two weeks after heat accumulation has started, and a curve $a_3$ shows the temperature one month after heat accumulation has started. It will be seen that in about one month, the temperature in a position 30 cm below the surface of the earth which lies immediately below the area in which the roots of the plants spread stands at 30° C., and the temperature near the surface of the earth (3 cm) is 20° C. on an average. These temperature remain substantially constant thereafter, with the atmospheric temperature standing at 10° C.

The depth of the underground heat accumulating section will be described. Assume that a change $\theta_o$ in the temperature in a certain plane under the ground can be expressed as $\theta_o = A\sin \omega t$. Then a change $\theta_x$ in the temperature in a plane parallel to the certain plane and spaced apart therefrom by x m can be expressed as $\theta_x = Ae^{-Kx} \sin(\omega t - Kx)$, where $\alpha$ is the thermal diffusivity of the soil and $K = (\omega/2\alpha)^{-\frac{1}{2}}$. By substituting $\alpha = 10^{-4}$ m$^2$/h, $\omega = 2\pi/24 \times 365$ and $x = 1.5$ m into this equation, a phase difference t at a point x is obtained by the following relationship: $t = Kx/2\pi = 2.2$ months. This relationship indicates that with the heat accumulating section having a depth of 1.5 m, the heat accumulated underground at a depth of 1.5 m from the ground level can reach the earth's surface on which the greenhouse stands in the coldest season, assuming that the accumulation of heat can be continued up to December. Also, by calculating the influences exerted by changes in the mean temperature of each month on the ground level on the temperature of the earth below the ground level, it is possible to obtain a reduction of 31% at a depth 1.5 m below the ground level. Meanwhile the phase difference between the temperature on the ground level and the temperature below the ground level at the depth of 1.5 m is 2.2 months, so that the temperature of the soil in October in which heat accumulation is initiated reaches a maximum level in the year and provides an advantageous condition for starting the accumulation of heat. The amount of heat Q accumulated at this time can be expressed by the following equation: $Q = \frac{1}{2}C\rho\Delta\theta_x$, where C is the specific heat of the earth, $\rho$ is the density of the earth, $\Delta\theta$ is the difference in temperature between the surface of the earth and a point which is 1.5 m below the ground level, and x is the depth of the heat accumulating section. In this equation, the amount of accumulated heat Q will be Q = 23.5 kwh/m$^2$ per unit area when the specific heat C of the earth is 2.52 kJ/Kg° C., the density of the soil is 1500 kg/m$^3$, and the floor space of the main body 1 of the greenhouse is 24 m$^2$.

As to the heat balance in the greenhouse, Generally, accumulation of the radiant energy of the sun in the surface layer of the earth in the greenhouse is carried out for about eight hours a day on an average of 45 w/m$^2$ in winter, so that the amount of heat accumulated per day is 360 wh/m$^2$d. Also, release of heat from the earth into the greenhouse is carried out for sixteen hours a day on an average of 36 w/m$^2$ in winter, so that the amount of heat dissipated per day is 576 kwh/m$^2$. Thus, the amount of heat actually consumed is 216 wh/m$^2$d. By consuming heat at the aforesaid rate, the aforesaid amount of heat accumulated or 23.5 kwh/m$^2$ would be consumed in 3.5 months.

By taking into consideration the thermal diffusivity of the soil, the amount of heat accumulated underground and the heat balance of the greenhouse, the optimum depth at which the underground radiator 2 is embedded below the surface of the earth will be about 1.5 m. A depth over 1 m from the surface of the earth will be an effective depth depending on the time at which heat accumulation is started, the heat accumulating rate, and other factors. The underground radiator 2 may be constructed such that it is surrounded by latent heat accumulating material and has soil placed thereon in layers. In this heat accumulating construction, it is possible to increase the amount of heat accumulated per unit area and to reduce the area of the underground radiator or the length of the serpentine tube.

The area required for the heat collector 3 will be described. The area required for this purpose can be obtained from the relation between the amount of heat input of 19.4 w/m$^2$ per unit area referred to hereinabove and an average amount of heat collected by the heat collector a day ("average radiation from the sun" × "average time from sunrise to sunset" × "heat collecting efficiency"). Thus, the area would be 1/6 the floor space of the greenhouse when the average radiation for October, the time from sunrise to sunset and the heat collecting efficiency are 814 w/m$^2$, 6 h and 0.6, respectively. By starting heat accumulation earlier than October, the amount of accumulated heat can be increased and the required area of the heat collector 3 can be correspondingly reduced. Thus, the area of the heat collector 3 would be advantageously over 1/6 the floor space of the greenhouse.

The underground radiator 2 will now be described. Let the radius, the surface area and the spacing interval of parallel portions of the heat dissipating serpentine tube of the underground radiator 2 and the floor space of the greenhouse be denoted by r, $S_p$, p and $S_G$, respectively. Then the ratio of the surface area $S_p$ of the heat dissipating tube to the floor space $P_G$ $S_p/S_G$ has the following relationship:

$$S_p/S_G = 2\pi/(p/r).$$

In the embodiment described hereinabove in which the underground radiator 2 is disposed about 1.5 m from the surface of the earth, the amount of heat transferred from the underground radiator 2 to the surface of the earth on which the greenhouse stands is about 0.7 w/m$^2$. °C. when the ratio $S_p/S_G$ is 1.0 (or $p/r = 2\pi$). This value is 0.6 w/m$^2$. °C. when $S_p/S_G$ is 0.1 (or $p/r = 20\pi$) and 0.54 w/m$^2$. °C. when $S_p/S_G$ is 0.05 (or $p/r = 40\pi$). Thus, a large variation in the area ratio $S_p/S_G$ causes no great change in the amount of transferred heat. For practical purposes, any value above 0.05 would be enough for the area ratio $S_p/S_G$.

The temperature at which the underground radiator 2 is heated should be limited to 70° C. at maximum by taking into consideration the effects exerted by heat on the ecology of microorganisms in the soil. Also, the underground radiator 2 may be of any construction as desired so long as its heat transfer area with respect to the earth is over about 0.05 time the floor space of the main body of the greenhouse. For example, the underground radiator 2 may consist of the heat dissipating tube alone, metal plates may be attached close to the surface of the heat dissipating tube or heat-transfer fins may be connected to the heat dissipating tube. The heat dissipating tube may be formed of a synthetic resinous material of a thermal conductivity equal to or higher than that of the soil. The heat dissipating tube may have an inner wall surface which is not circular but elliptic or any other irregular shape in cross section.

Experiments were carried out on heating the interior of the greenhouse by spontaneous heat release into the greenhouse from the heat source consisting of the underground accumulated heat stemming from the radiant energy of the sun collected and stored underground over a prolonged period of time, at midnight in early January when the outdoor temperature was −0.7° C. The results obtained show that the temperature stands at 6.7° C. in the center of the greenhouse and at 10° C. near the floor where the plants rooted in the soil grow, and that it is possible to keep the difference between the outdoor temperature and the indoor temperature at over 7° C. It will be seen that the condition is favorable for cultivation of tomatoes, strawberries, pumpkins, eggplants and cucumbers which are said to require a minimum temperature of below 10° C. at night.

Figure 4:
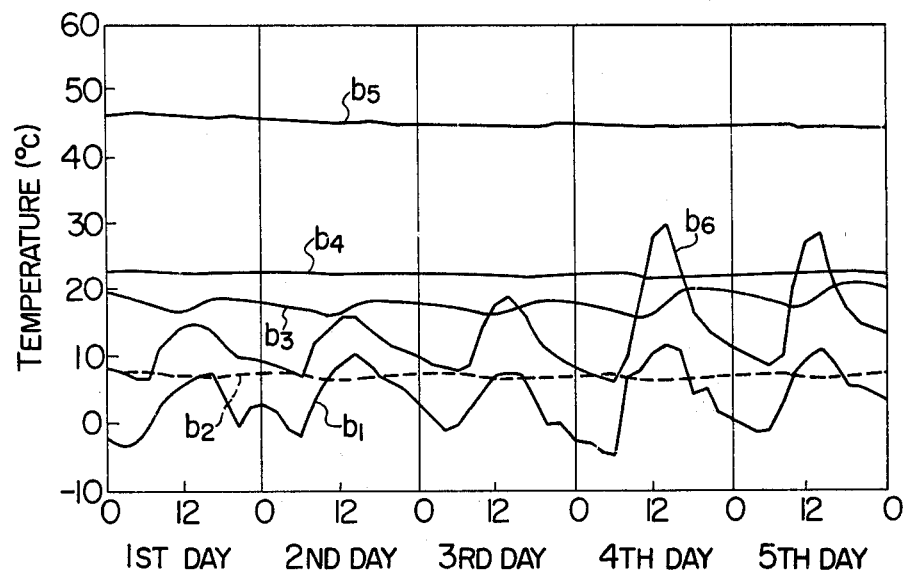
FIG. 4 is a graph in explanation of changes in temperature occuring in various sections of the greenhouse shown in FIG. 1 for consecutive five days in winter.

FIG. 4 is a diagram showing changes in temperature in various sections of the greenhouse of this embodiment occurring for five consecutive days in the wintertime. The weather was cloudy on the first, second and third days and fine on the fourth and fifth days. In the diagram, a curve $b_1$ represents the outdoor temperature, a curve $b_2$ represents the temperature of the soil 25 cm below the surface outside the greenhouse, curves $b_3$, $b_4$ and $b_5$ represent the temperatures of the soil 3, at 27 and 147 cm below the surface, respectively, of the heat accumulating section, and a curve $b_6$ represents the indoor temperature of the greenhouse. In the diagram of FIG. 4, it will be seen that the indoor temperature shows little change regardless of the weather, and that, although the temperature of the soil at a point of 25 cm from the surface outside the greenhouse is about 7.5° C., the temperature of the soil at a point of 3 cm from the surface inside the greenhouse is 18° C. and rises in going further deeper into the earth. In view of the fact that minimum soil temperature at which cultivation of vegetables can be carried out for practical purposes is about 18° C., this soil temperature would be considered optimum for raising the aforesaid vegetables. At this time, the temperature of the soil at a point 1.5 m from the surface is 45° C. which has a difference of about 25° C. with respect to the temperature of the soil near the surface, and release of heat to the surface of the earth continues.

Figure 5:
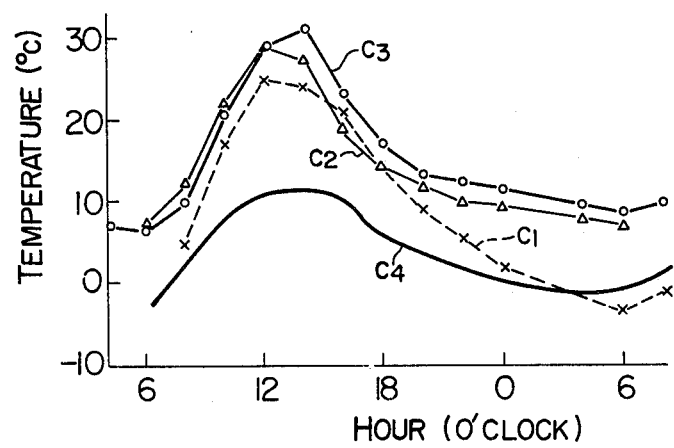
FIG. 5 is a graph comparing the greenhouse of the underground heat accumulation system with greenhouses of the prior art.

FIG. 5 is a diagrammatic representation of the results of tests in which changes in the temperature in the greenhouse of the system of underground storing of heat over a prolonged period of time according to the invention are compared with those in the greenhouses of the system of vinyl sheet house and the system of underground storing of heat for a short period of time by selecting days of similar weather conditions. In the diagram of FIG. 5, curves $C_1$, $C_2$ and $C_3$ represent temperatures in the greenhouses of the vinyl sheet house system, short period heat storing system, and long period heat storing system respectively, and a curve $C_4$ indicates outdoor temperatures. It will be seen in the diagram that the system of long period heat storing shows a better performance than the system of short period heat storing, much less the vinyl sheet house system which lags far behind the system of long period heat storing system. An additional advantage of the system of long period heat storing over that of short period heat storing is that the former is capable of keeping the temperature in the greenhouse at an optimum level for several days even if inclement weather persists as compared with the latter whose performance may vary depending on whether it is fine or cloudy in the daytime.

From the foregoing description, it will be appreciated that the system of storing heat underground over a prolonged period according to the invention which accumulates below the surface of the earth the radiant energy of the sun at least in autumn and releases the stored energy by spontaneous release to heat the greenhouse is capable of maintaining the interior of the greenhouse at an optimum temperature level for the cultivation of vegetables throughout the period of severe cold and of achieving better results in heating the greenhouse than the system of short period heat storing. In the foregoing description, the radiant energy of the sun has been described as being used as a source of thermal energy to be stored in the underground heat accumulating section. However, it is to be understood that the invention is not limited to this specific form of thermal energy and that wasted thermal energy may be used as a source of thermal energy to be stored in the underground heat accumulating section.

Cultivation of plants was carried out by usual means in the greenhouse according to the invention in which spring-sown vegetables were sown in December and harvested at the beginning of March. This is attributed to not only the high temperature in the greenhouse but also the high temperature of the soil which promotes the growth of the roots.

Thus, the invention enables the greenhouse to be kept at a room temperature of over 6° C. and the soil at a temperature of over 16° C. by utilizing the radiant energy of the sun or wasted thermal energy without using fossil fuel, thereby making it possible to cultivate spring sown vegetables in winter.

Generally a greenhouse consumes about 2 liter/m² of fossil fuel for heating purposes in one winter. If the heating of the greenhouse can be effected by utilizing the radiant energy of the sun alone, it would be possible for a greenhouse of 1000 m² to conserve 2000 liters of oil. Moreover, since the radiant energy of the sun is free from the danger of polluting the air and its supply is inexhaustible, the utilization thereof offers advantages besides being able to conserve energy stemming from fossil fuel.

Thus, the invention enables the temperature in a greenhouse at a suitable level in winter without using fossil fuel.

What is claimed is:

1. A greenhouse having an underground heat accumulation system comprising a main body having heat from a heat source accumulated underground below a floor thereof for use in heating an interior of the greenhouse, comprising:

an underground radiator located at a predetermined depth below the floor of the greenhouse, said underground radiator cooperation with soil in a vicinity thereof to constitute an underground heat accumulating section;

a solar heat collector for collecting radiant energy from the sun, said solar heat collector being thermally connected to said underground radiator of said underground heat accumulating section;

a fluid heated by the radiant energy collected by said solar collector, said fluid being circulated through the underground radiator of the underground heat accumulating section; and wherein the predetermined depth of the underground radiator is determined by the relationship:

$x = t/C,$ where:
- x = predetermined depth of the underground radiator,
- t = a time period, in months, from a moment at which an accumulation of solar heat has begun until a moment at which the solar heat is used in the greenhouse, and
- C = a constant determined in accordance with a physical property of the soil under the floor of the greenhouse;

whereby the solar energy is accumulated in the underground heat accumulating section and utilized as a heat source in the greenhouse after an elapse of the time t.

2. A greenhouse as claimed in claim 1, further comprising sensing means for sensing the temperatures of the fluid at the inlet and the outlet of said solar heat collector and the temperature differential between them, said sensing means being operative to allow the heated fluid to circulate through the underground radiator of the underground heat accumulating section when the temperature differential is above a predetermined value and the temperature of the heated fluid at the outlet of the solar heat collector is within a predetermined range of values.

3. A greenhouse as claimed in claim 1, wherein the heat collector and the underground radiator of the underground heat accumulating section constitute one system.

4. A greenhouse as claimed in claim 1, wherein the heat solar collector constitutes one system and the underground radiator of the underground heat accumulating section constitutes another system, and the two systems are thermally connected together by a heat exchanger.

5. A greenhouse as claimed in claim 3 or 4, wherein the fluid circulated through the solar heat collector and the underground radiator of the underground heat accumulating section is hot water.

6. A greenhouse as claimed in claim 3 or 4, wherein the fluid circulated through the solar heat collector and the underground radiator of the underground heat accumulating section is heated air.

7. A greenhouse as claimed in claim 4, wherein different types of fluid are circulated through the system of the solar heat collector and the system of underground radiator of the underground heat accumulating section.

8. A greenhouse as claimed in claim 1, wherein the underground radiator comprises a serpentine tube for dissipating heat.

9. A greenhouse as claimed in claim 1, wherein the underground radiator comprises a serpentine tube for dissipating heat, and metal plates connected to the serpentine tube.

10. A greenhouse as claimed in claim 1, wherein the underground radiator of the underground is formed of a synthetic resinous material having a thermal conductivity equal to or higher than the thermal conductivity of the soil below the surface of the earth.

11. A greenhouse as claimed in claim 1, wherein the underground radiator of the underground heat accumulating section has an area for releasing heat to the soil which is over 1/20 the floor space of the greenhouse.

12. A greenhouse as claimed in claim 1, wherein the solar heat collector has an area which is over 1/6 the floor space of the greenhouse.

13. A greenhouse as claimed in claim 1, wherein the predetermined depth of the underground radiator is at least 1 m.

14. A greenhouse as claimed in claim 1, wherein the physical property of the soil is at least one of thermal conductivity and specific heat.

* * * * *